United States Patent
Puleo, Sr.

(10) Patent No.: US 6,648,497 B2
(45) Date of Patent: Nov. 18, 2003

(54) FIBER OPTIC CHRISTMAS TREE STAND

(76) Inventor: Salvatore J. Puleo, Sr., 15 Sequoia Dr., Watchung, NJ (US) 07060

( * ) Notice: Subject to any disclaimer, the term of this patent is extended or adjusted under 35 U.S.C. 154(b) by 0 days.

(21) Appl. No.: 09/978,217

(22) Filed: Oct. 15, 2001

(65) Prior Publication Data

US 2002/0093835 A1 Jul. 18, 2002

Related U.S. Application Data

(60) Provisional application No. 60/261,562, filed on Jan. 15, 2001.

(51) Int. Cl.$^7$ .............................. A41G 1/00; F21V 29/00
(52) U.S. Cl. ..................... 362/568; 362/373; 362/580
(58) Field of Search ................. 362/122, 123, 362/293, 294, 373, 567, 568, 580, 581, 564, 565

(56) References Cited

U.S. PATENT DOCUMENTS

| | | | | |
|---|---|---|---|---|
| 1,134,878 A | * | 4/1915 | Laszczak | 362/161 |
| 1,558,570 A | * | 10/1925 | Adams | 362/294 |
| 1,637,072 A | * | 7/1927 | Conover | 362/294 |
| 2,905,414 A | | 9/1959 | Zierden | 248/146 |
| 2,980,377 A | | 4/1961 | Nielsen et al. | 248/523 |
| 3,119,586 A | | 1/1964 | Hoffman | 248/524 |
| 3,465,139 A | | 9/1969 | Siegal | 40/431 |
| 3,536,908 A | | 10/1970 | Oster | 40/431 |
| 3,564,233 A | | 2/1971 | Cox et al. | 40/444 |
| 3,766,376 A | | 10/1973 | Sadacca et al. | 40/433 |
| 4,034,215 A | | 7/1977 | Hashimoto | 362/565 |
| 4,068,118 A | | 1/1978 | Carrington | 362/123 |
| 4,125,781 A | | 11/1978 | Davis, Jr. | 307/11 |
| 4,349,864 A | * | 9/1982 | Smith | 362/122 |
| 4,612,219 A | | 9/1986 | Tengs et al. | 428/8 |
| 4,686,611 A | * | 8/1987 | Von Kohorn | 362/123 |
| 4,777,571 A | | 10/1988 | Morgan | 362/123 |
| 4,878,157 A | | 10/1989 | Koch | 362/123 |
| 5,054,236 A | | 10/1991 | Sands | 47/79 |
| 5,103,380 A | | 4/1992 | Lindner et al. | 362/568 |
| 5,104,608 A | | 4/1992 | Pickering | 362/568 |
| D326,626 S | | 6/1992 | McKnight | D11/118 |
| 5,226,709 A | | 7/1993 | Labranche | 362/568 |
| 5,306,366 A | | 4/1994 | Shattan | 156/61 |
| 5,422,797 A | | 6/1995 | Shattan | 362/123 |
| 5,517,390 A | | 5/1996 | Zins | 362/123 |
| 5,527,010 A | | 6/1996 | Kao | 248/519 |
| 5,558,422 A | | 9/1996 | Sanford | 362/565 |
| 5,639,157 A | | 6/1997 | Yeh | 362/123 |
| 5,707,037 A | | 1/1998 | Pasterick | 248/516 |
| 5,779,353 A | * | 7/1998 | Kacheria | 362/293 |
| 5,820,248 A | * | 10/1998 | Ferguson | 362/123 |
| 5,829,863 A | * | 11/1998 | Gutshall | 362/123 |

FOREIGN PATENT DOCUMENTS

| | | |
|---|---|---|
| DE | 4118695 A1 | 12/1992 |
| JP | 06159739 A | 6/1994 |
| JP | 04273286 A | 9/2002 |

* cited by examiner

*Primary Examiner*—Alan Cariaso
(74) *Attorney, Agent, or Firm*—Brian K. Johnson, Esq., LLC

(57) ABSTRACT

A Christmas tree stand has a base for supporting the stand above a ground level and a shell having a lateral surface. The shell is disposed atop the base so as to define an inner volume and the shell houses electrical components within the inner volume. The shell has a plurality of holes disposed on a top portion of the lateral surface that provide ventilation between the inner volume and an outside environment. Further, the shell has a flange overhanging the top portion of the lateral surface so as to shield the holes. A base may also be provided for the Christmas tree stand including an elevated surface and a support structure for supporting the elevated surface above the ground level. Finally, the elevated surface may define one surface of the inner volume.

11 Claims, 4 Drawing Sheets

FIBER OPTIC CHRISTMAS TREE STAND

CROSS-REFERENCE TO RELATED APPLICATIONS

This application claims the benefit of the U.S. Provisional Patent Application having serial No. 60/261,562 and filed on Jan. 15, 2001, the disclosure of which is incorporated by reference herein.

FIELD OF THE INVENTION

The present invention relates to the field of Christmas tree stands, and in particular, to Christmas tree stands, suitable for outdoor use, that support artificial, fiber optic Christmas trees and house the electronic components needed for such.

BACKGROUND OF THE INVENTION

Christmas tree stands having a variety of characteristics have been developed for supporting artificial, fiber optic Christmas trees. In addition to supporting the Christmas tree, these stands also typically house some or all of the electrical components used to illuminate the fiber optics of the tree. An example of such a Christmas tree stand is shown in U.S. Pat. No. 5,820,248 ("Ferguson"). Ferguson discloses a fiber optic Christmas tree stand having an inner cavity for holding a number of electrical components that illuminate the tree's fiber optics. Ferguson's tree stand also includes a plurality of air vents that permit the heat generated within the cavity to be vented to the outside environment.

Another example of a fiber optic Christmas tree stand is provided in U.S. Pat. No. 5,829,863 ("Gotshall"). Gotshall discloses a circular Christmas tree base having a number of electrical components and switches disposed on the exterior of the base that control the illumination and musical effects provided with the Christmas tree base. As with Ferguson, a plurality of apertures are included in the periphery of the base housing to provide ventilation for the lamp, motor and color wheel assembly disposed within the tree base.

An artificial, fiber optic Christmas tree of a slightly different design is disclosed in U.S. Pat. No. 5,517,390 ("Zins"). Zins' fiber optic Christmas tree includes a base or stand that supports a main tree trunk from which the fiber optically illuminated branches of the artificial tree extend. Zins further discloses a plurality of cooling vents disposed on the tree trunk itself for ventilating the heat generated by the fiber optic light sources within the tree branches. A cooling fan is provided for within the interior of the main trunk that circulates the air past the lighting elements in the tree branches. The circulated air is drawn in the vents at one end of the tree trunk and expelled out the vents at the other end.

Each of these designs are well suited for indoor use where the accumulation of snow and other debris will not impede the flow of air through the tree base in providing the necessary cooling functions. Heretofore, however, no design robust enough to function in a harsh outdoor environment has been provided for a fiber optic Christmas tree stand. In particular, the cooling ability provided by the Christmas tree stand must be protected from the elements such that accumulated snow, blowing debris and other harsh environmental aspects present in a wintry environment do not impair the cooling efficiency of the stand.

SUMMARY OF THE INVENTION

In one major aspect of the invention, a Christmas tree stand is provided for having a base for supporting the stand above a ground level; and a shell having a lateral surface, the shell disposed atop the base so as to define an inner volume, the shell housing electrical components within the inner volume, the shell having a plurality of holes disposed on a top portion of the lateral surface, the holes providing ventilation between the inner volume and an outside environment, the shell having a flange overhanging the top portion of the lateral surface so as to shield the holes.

In a particularly preferred embodiment of the invention, the Christmas tree stand further includes a body including the lateral surface, the body having an upper rim and a plurality of notches cut from the lateral surface along the body at the upper rim; and a cover including a bottom surface and the flange, the cover disposed atop the upper rim of the body, the holes defined by the notches and the bottom surface of the cover. In addition, the base and the shell of the Christmas tree stand base and the shell may are constructed of molded plastic.

In another preferred aspect of the invention, the cover further includes a receptacle for holding the Christmas tree. Further, the receptacle for the Christmas tree stand may further include an optically transparent cap disposed at a bottom of the receptacle, and the electrical components may include a lamp, a color wheel and a motor to rotate the color wheel, the lamp, color wheel and optically transparent cap disposed in optical alignment with each other so as to provide a light source at the bottom of the receptacle.

In yet another preferred aspect of the invention, the base of the Christmas tree stand includes an elevated surface and a support structure for supporting the elevated surface above the ground level, the elevated surface defining one surface of the inner volume. Further, the support structure may include a plurality of legs In yet another aspect of the invention, the base of the Christmas tree stand is shaped as a truncated frustum or includes a connector for providing an electrical coupling to the electrical components. In addition, the base may include a bottom surface disposed on the ground level, the bottom surface including a wire channel for accommodating wires for connection to the connector. Finally, the base of the Christmas tree stand may include a mounting for supporting the color wheel, the motor and the lamp within the inner volume.

DETAILED DESCRIPTION OF THE INVENTION

Figure 1:
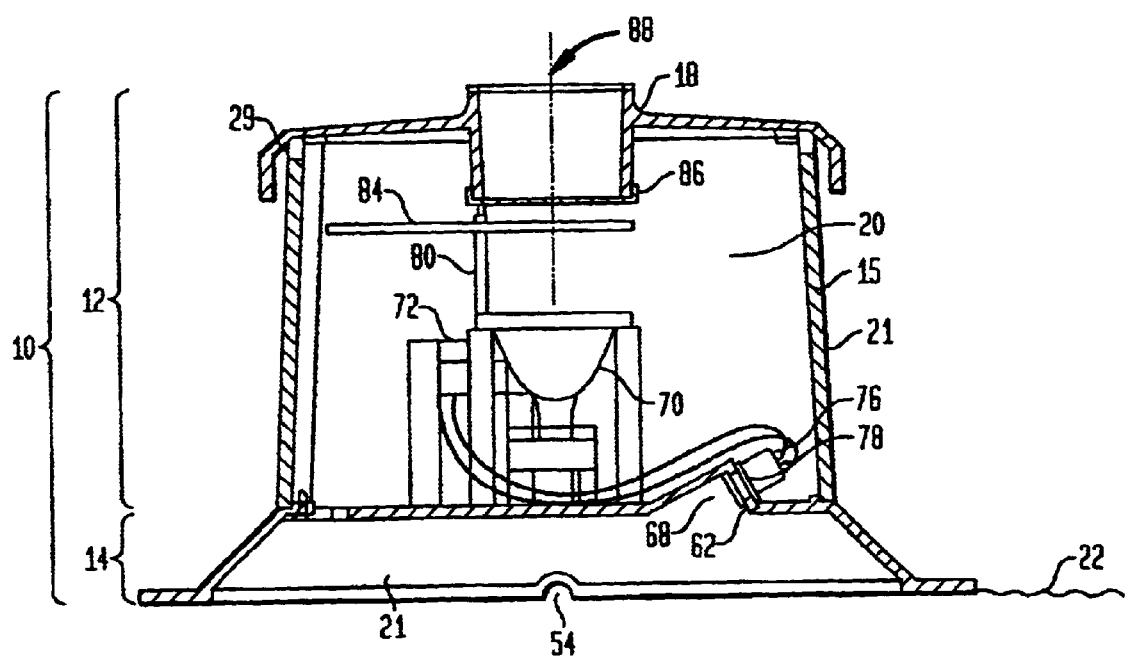
FIG. 1 is a sectional side view of the fiber optic Christmas tree stand according to one embodiment of the present invention.

Referring now to FIG. 1, a preferred embodiment of the fiber optic Christmas tree stand 10 according to the present invention is shown. In general, fiber optic Christmas tree stand 10 is comprised of a shell 12 and a base 14. As shown in the particular embodiment of FIG. 1, shell 12 includes cylindrical body 15 disposed atop base 14. Cover 18 is disposed atop body 15 so as to provide an enclosed inner volume 20. Enclosed inner volume 20 may be used, for example, to house the electrical components used in conjunction with the fiber optic Christmas tree (not shown).

Figure 2A:
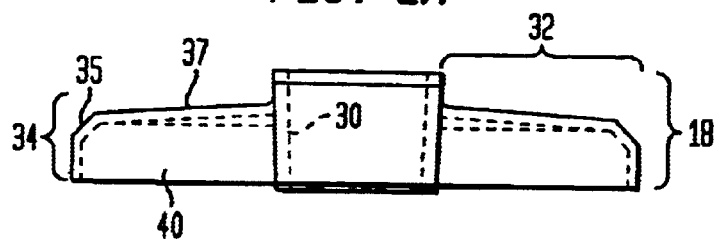
FIGS. 2A–2C are the side, bottom and top views respectively of the cover of the fiber optic Christmas tree stand according to one embodiment of the present invention.
Figure 2B:
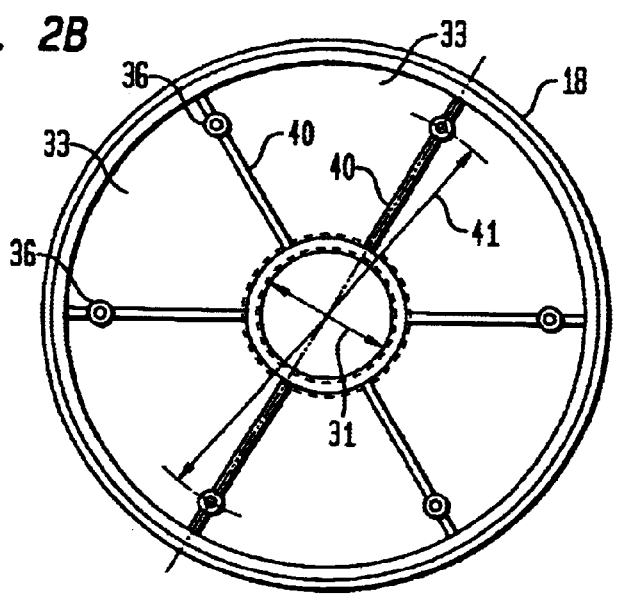
Figure 2C:
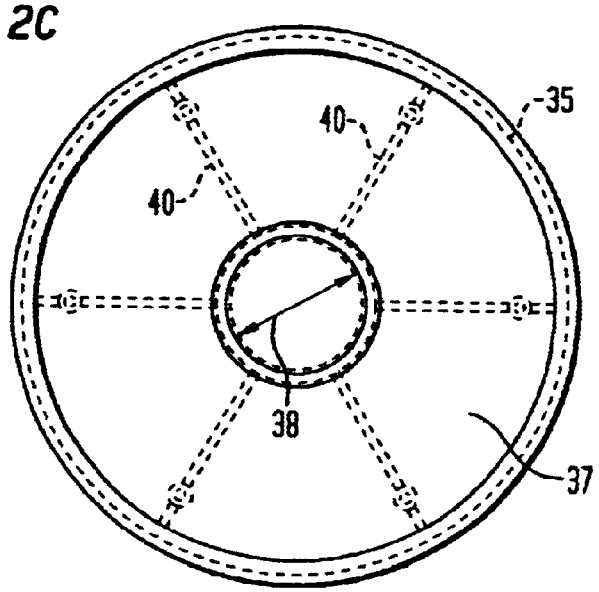

As shown more clearly in FIGS. 2A–2C, cover 18 is preferably formed as a single molded piece of plastic. The molded plastic cover includes a tapered central receptacle 30 into which the trunk of the artificial fiber optic Christmas tree may be inserted. The tapered nature of the receptacle provides a smaller diameter 31 at the bottom of the receptacle than the diameter 34 at the top of the receptacle so as to facilitate the insertion and securing of the artificial Christmas tree trunk in the cover 18. Cover 18 further includes a molded canopy 32 that extends radially outward from the central receptacle 30 and terminates at beveled edge 35. The upper surface 37 of canopy 32 is preferably slightly angled with respect to the horizontal ground level 22 shown in FIG. 1.

Extending from canopy 32 at the beveled edge 35 are downwardly projecting flanges 34 that are molded as part of cover 18. Support ribs 40 are also molded as part of the underside surface 33 of cover 18 to provide support for both the canopy 32 and the flanges 34. Underside surface 33 further provides an upper surface for enclosing inner volume 20 when cover 18 is disposed atop body 15. Support ribs 40 extend radially from receptacle 30 to the flanges 34 as shown in the embodiment of FIGS. 2A–2C. Screw securing holes 36 are also formed at the periphery of molded plastic ribs 40, preferably at an equal radial distance 41 from the central receptacle 30.

Figure 3A:
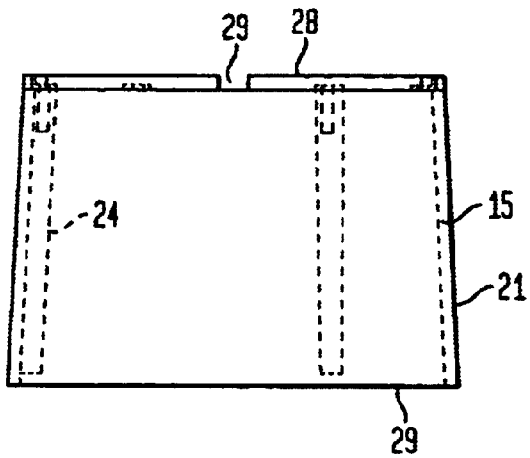
FIGS. 3A–3C are the side, top and bottom views respectively of the body of the fiber optic Christmas tree stand according to one embodiment of the present invention.
Figure 3B:
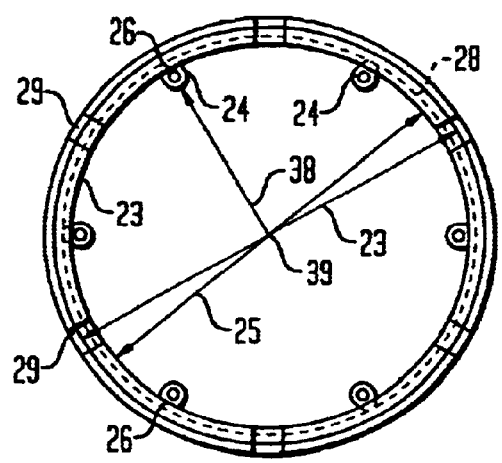
Figure 3C:
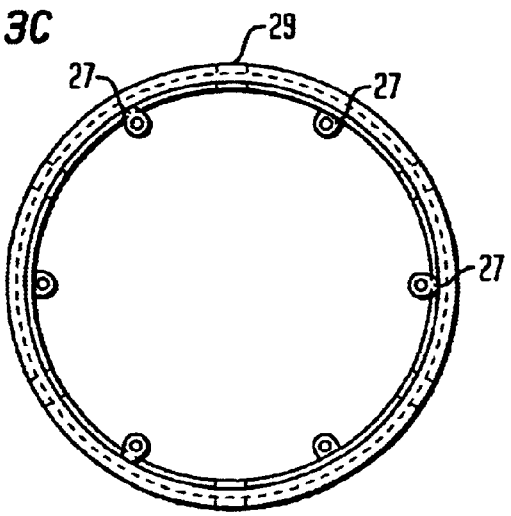

As shown in more detail in FIGS. 3A–3C, body 15 is also preferably formed from a ridged molded plastic. In the particular embodiment of FIGS. 3A–3C, body 15 is a cylindrical structure that has an outer body surface 21 having inner support ridges 24 disposed vertically on the inner body surface 23 of body 15. Inner support ridges 24 provide shear support for body 15 as well as having screw securing holes 26 within inner support ridges 24. Screw securing holes 26, disposed at radial distance 38 from center 39, are spaced and sized so as to be mateably aligned with screw securing holes 36 on cover 18 such that cover 18 and body 15 are matably engaged and connected with screws extending through these holes. Body 15 may be tapered slightly, therefore having a upper average diameter 25 smaller than a lower average diameter 21, so as to provide a more balanced support for the cover 18 and consequently the fiber optic Christmas tree.

Body 15 further includes upper ridge 28. Along upper ridge 28, notches 29 are cut from the upper ridge. Notches 29 may be physically cut from the molded plastic body 15 after the formation of the body, or alternatively, may be included as part of the cast molding for body piece 15. Notches 29 are disposed in a plurality of locations around the circumference of upper ridge 28. As shown in FIG. 1, notches 29 create holes joining inner volume 20 and the outside environment of the fiber optic Christmas tree stand when cover 18 is placed on body 15 and securely fastened thereto.

Figure 4A:
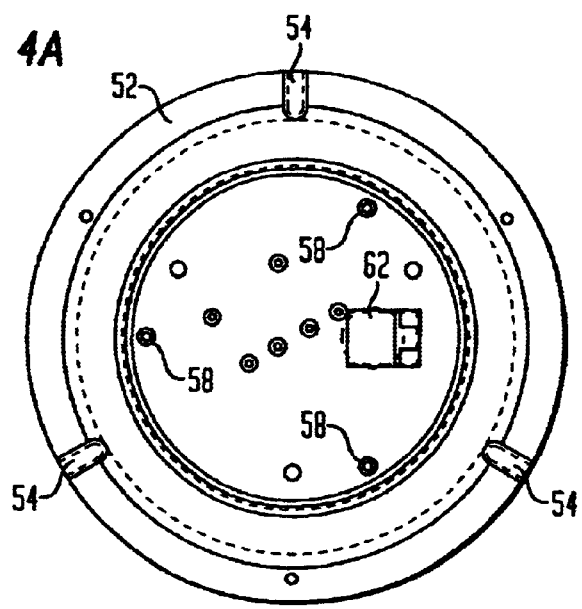
FIGS. 4A–4C are the top, bottom and side views respectively of the base of the fiber optic Christmas tree stand according to one embodiment of the present invention.
Figure 4B:
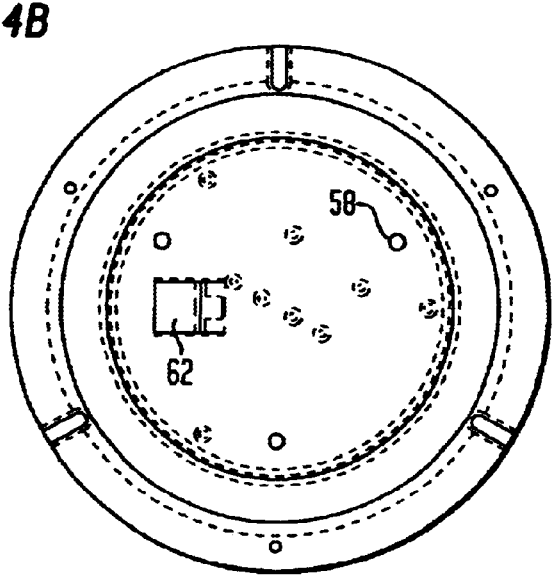
Figure 4C:
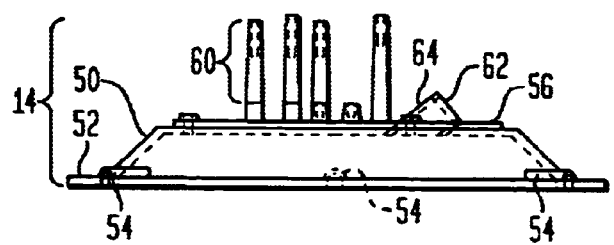

The base 14 of the fiber optic Christmas tree stand is shown in detail in FIGS. 4A–4C. In the preferred embodiment of FIGS. 4 the base includes a conical frustum 50, again preferably manufactured from molded plastic. As part of frustum 50, rim 52 extends as a flange from the truncated frustum 50 providing contact with the ground level 22. Rim 52 has wire channels 54 that are constructed as semi-circular raised portions of rim 52 as shown in FIG. 1. Truncated frustum 50 further includes a support surface 56 on which on which the lower ridge 29 of body 15 rests. Base 14 is assembled to body 15 via screw securing holes 58 which are spaced and sized to be mateably engaged with screw securing holes 27 provided at the bottom of inner support ridges 24 on body 15. (FIG. 3c.)

Base 14 also includes mounting structure 60 partly consisting of formed plastic supports extending from upper surface 56 of base 14. Mounting structure 60 provides slots and screw securing holes for affixing the electrical components within inner volume 20 of the fiber optic Christmas tree stand. Also disposed on upper surface 56 is electrical connector 62. In the preferred embodiment shown in FIG. 4c, electrical connector 62 is disposed within a preformed angled portion 64 of upper surface 56. Preformed angled portion 64 provides clearance area 68, shown in FIG. 1, so as to provide space for connection to the electrical connector 62 beneath upper surface 56.

Screws are a preferred means for fastening body 15 to base 14 and cover 18 although other suitable fastening means may be used to engage these elements at mutual contact points on the pieces. For example, the base 14, body 15 and cover 18 may also be welded together at various weld joints around the upper and lower rims 28 and 29 respectively of body 15. As another example, snappable engagement mechanisms may be used to engage these pieces.

The electrical components disposed within inner volume 20 of the fiber optic Christmas tree stand 10 are shown in FIG. 1. In particular, lamp 70 and motor 72 are affixed to mounting structures 60 of base 14. Lamp 70 and motor 72 are connected to electrical connector 62 via wiring 76 terminating in electrical connector 78. Motor 72 is connected to a spindle 80 that is disposed vertically within fiber optic Christmas tree base 10. Spindle 80 terminates at the top with color wheel 84. The upper portion of spindle 80 may be fixably attached to the lower portion of cover 18 so as to provide a second connection point thereby maintaining a stable axis about which to rotate spindle 80. Also disposed at the bottom of receptacle 30 of cover 18 is optically transparent cap 86. Light generated by lamp 70 is projected upwards through rotating color wheel 84, through optically transparent cap 86, and on into receptacle 30 into which the base of fiber optic Christmas tree is placed. Lamp 70, color wheel 84 and optical transparent cap 86 are all disposed so as to be optically aligned along optical axis 88 so as to provide illumination to the fiber optic strands at the trunk of the fiber optic tree inserted into receptacle 30.

In operation, motor 72 drives spindle 80 to rotate color wheel 84. Illumination light emanating from lamp 70 passes through rotating color wheel 84 to provide light at the optically transparent cap 86. As the color wheel 84 rotates, monochromatic light from lamp 70 is filtered via different colored sections of color wheel 84 so as to provide different illumination colors of to impinge upon the fiber optic strands located at the base of the fiber optic tree inserted into receptacle 30.

Referring back to FIG. 1, enclosed inner volume 20 provides a protective, insulated environment, separate and distinct from the harsher outdoor environment outside the fiber optic Christmas tree stand, for housing the elementally sensitive electrical and mechanical components of the fiber optic system. In this regard, the electrical components, such at the lamp 70, the motor 72, and the rotating color wheel, 80 & 84, require a relatively moisture-free environment as well as proper ventilation for cooling these components. The above-described placement and construction of the fiber optic Christmas tree stand facilitates the protection and ventilation of these components in the required manner. For example, cover 18 has a sloped canopy 32 so that snow and other debris falling on the canopy easily slide off of the canopy onto the ground level 22. Further, overhanging flange 34 of cover 18 shields the holes formed by notches 29 and upper surface 37 from debris that is driven by the wind in a direction perpendicular to the lateral side 22 of body 15 and prevents the debris and snow from entering the holes and plugging them up. Also, the holes formed by notches 29 and upper surface 37 provide venting holes that permit the heat generated by the electrical components within volume 22 to escape the fiber optic Christmas tree stand 10. Further, base 14 includes raised surface 56 so that the electrical components within volume 20 are elevated above ground level 22 which prevents debris and snow accumulating around the truncated frustum of base 14 from covering the portions of body 15 containing the electrical components. In particular, volume 21 within base 14, in combination with wiring channel 54, is provided underneath raised surface 56 so that electrical connection may be made to electrical connector 78 through electrical connector 62 without having the weight of the fiber optic Christmas tree stand bearing upon the electrical cords providing the electricity to the electrical components.

Fans and other cooling apparatus may also be disposed within volume 20 to assist in the circulation of air and the expulsion of heat through the holes formed by notches 29. Further, the holes may be formed by simply punching holes with lateral surface 22 of body 15, as opposed to the covering of notches 29.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention. In particular, the embodiments described herein may be used to support any type of outdoor decoration that uses an associated light or electrical equipment and for which protection from the outdoor environment is required for those components while still proving adequate ventilation within the support.

What is claimed is:

1. A stand comprising:

a base;

a shell having a lateral surface, said shell disposed atop said base so as to define an inner volume, said shell housing electrical components within said inner volume, said shell having a plurality of holes disposed on a top portion of said lateral surface, said holes providing ventilation between said inner volume and an outside environment, said shell having a flange overhanging said top portion of said lateral surface so as to shield said holes; and a cover disposed atop said shell, said cover including a receptacle configured to hold a fiber-optic decoration.

2. The stand according to claim 1 wherein said shell further comprises:

a body including said lateral surface, said body having an upper rim and a plurality of notches cut from said lateral surface along said body at said upper rim; and wherein said a cover includes a bottom surface and said flange, said cover disposed atop said upper rim of said body, said holes defined by said notches and said bottom surface of said cover.

3. The stand according to claim 1 wherein said base and said shell are constructed of molded plastic.

4. The stand according to claim 1 wherein said receptacle is configured to receive a fiber-optic Christmas tree.

5. The stand according to claim 1 wherein said receptacle further comprises an optically transparent cap disposed at a bottom of said receptacle, and said electrical components include a lamp, a color wheel and a motor to rotate said color wheel, said lamp, color wheel and optically transparent cap disposed in optical alignment with each other so as to provide a light source at said bottom of said receptacle.

6. The stand according to claim 1 wherein said base includes an elevated surface and a support structure for supporting said elevated surface above said ground level, said elevated surface defining one surface of said inner volume.

7. The stand according to claim 6 wherein said support structure includes a plurality of legs.

8. The stand according to claim 1 wherein said base is shaped as a truncated frustum.

9. The stand according to claim 1 wherein said base further includes a connector for providing an electrical coupling to said electrical components.

10. The stand according to claim 6 wherein said base further includes a bottom surface disposed on said ground level, said bottom surface including a wire channel for accommodating wires for connection to said connector.

11. The stand according to claim 5 wherein said base further includes a mounting for supporting said color wheel, said motor and said lamp within said inner volume.

* * * * *